Sept. 9, 1958 — E. V. COLLINS — 2,851,116
TRACTOR LEVELING DEVICE
Filed Jan. 19, 1954 — 4 Sheets-Sheet 1

Inventor
Edgar V. Collins
By [signature]
Attorney

Sept. 9, 1958  E. V. COLLINS  2,851,116
TRACTOR LEVELING DEVICE
Filed Jan. 19, 1954  4 Sheets-Sheet 3

Inventor
Edgar V. Collins
By Rudolph L. Lowell
Attorney

Sept. 9, 1958 E. V. COLLINS 2,851,116
TRACTOR LEVELING DEVICE
Filed Jan. 19, 1954 4 Sheets-Sheet 4
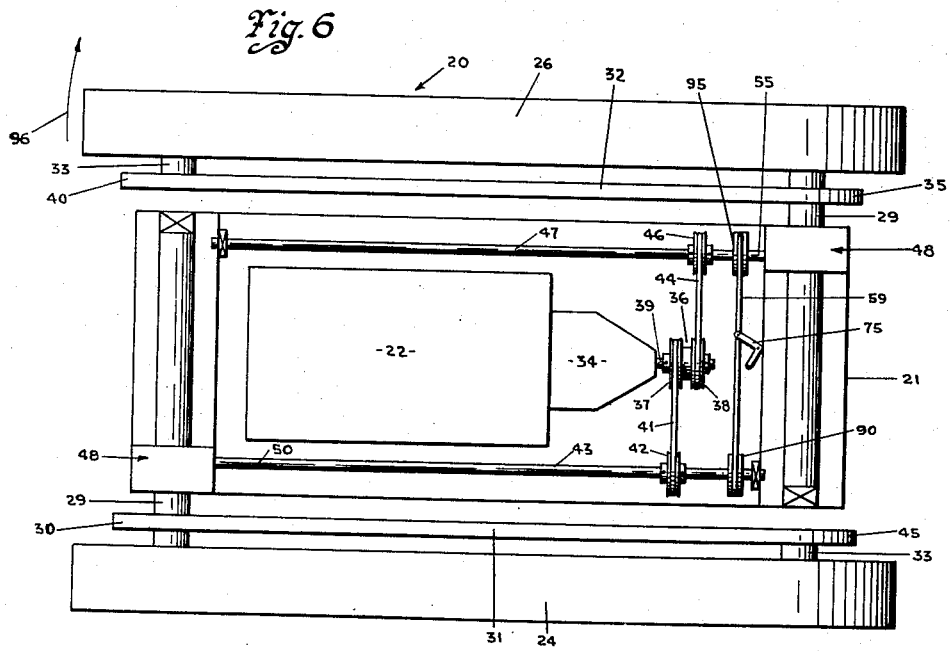
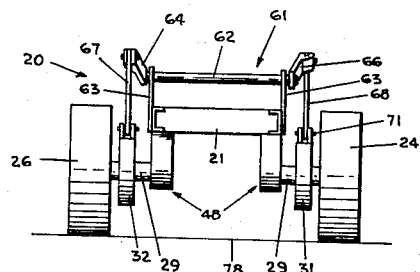
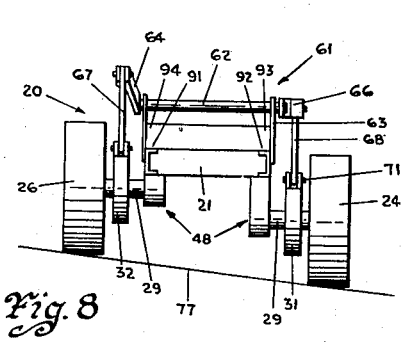
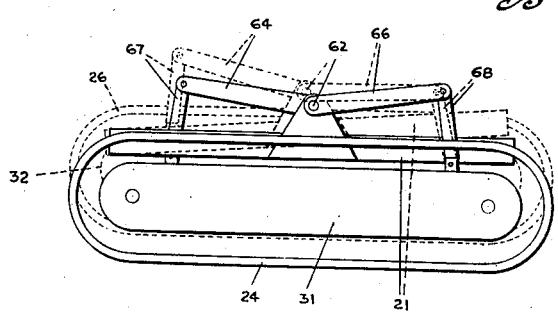
Inventor
Edgar V. Collins
By Rudolph R. Lowell
Attorney United States Patent Office 2,851,116
Patented Sept. 9, 1958

2,851,116

TRACTOR LEVELING DEVICE

Edgar V. Collins, Ames, Iowa

Application January 19, 1954, Serial No. 404,886

4 Claims. (Cl. 180—41)

This invention relates generally to tractor leveling devices and in particular to a tractor in which the ground engaging units therefor are adjustable to maintain an equal distribution of the tractor load on the ground engaging units.

An object of this invention is to provide an improved leveling device for a tractor.

A further object of this invention is to provide a tractor in which the track or ground engaging units at opposite sides of the tractor are concurrently vertically adjustable to maintain the load distribution of the tractor on such units, the same for travel of the tractor on a level or inclined surface.

Another object of this invention is to provide a tractor assembly in which the ground engaging units therefor are concurrently adjusted up and down to accommodate the travel of the tractor on a side hill without any appreciable side slippage.

Still another object of this invention is to provide a tractor in which the tractor main frame is pivotally supported on ground engaging units and movable through an actuating mechanism, connected to the frame and ground units, whereby the ground units are moved in up and down directions relative to the main frame, while maintaining, within the limits of the actuating mechanism, all portions of the tractor frame in transversely extended horizontal planes.

Yet a further object of this invention is to provide a tractor assembly which is rugged in construction, economical to manufacture and which includes a leveling device which is efficient within its own limits in operation to maintain the tractor assembly substantially level in a transverse direction during travel of the tractor on a side hill.

Further objects, features and advantages of this invention will become apparent from a consideration of the following description when taken in connection with the accompanying drawing in which:

Fig. 6 is a diagrammatic plan view of a part of the power transmitting mechanism for the tractor assembly of this invention;

Fig. 7 is a diagrammatic front elevational view of the tractor assembly of this invention, showing the relative positions of the tractor parts during travel of the tractor over substantially level ground;

Fig. 8 is a diagrammatic view, illustrated similarly to Fig. 7, showing the tractor during travel over ground which is inclined in a direction transversely of the tractor; and Fig. 9 is a diagrammatic side elevational view of the tractor showing the tractor parts in solid lines for the position of the track units shown in Fig. 7, and in dotted lines for the vertically adjusted position of the track units shown in Fig. 8.

Figure 1:
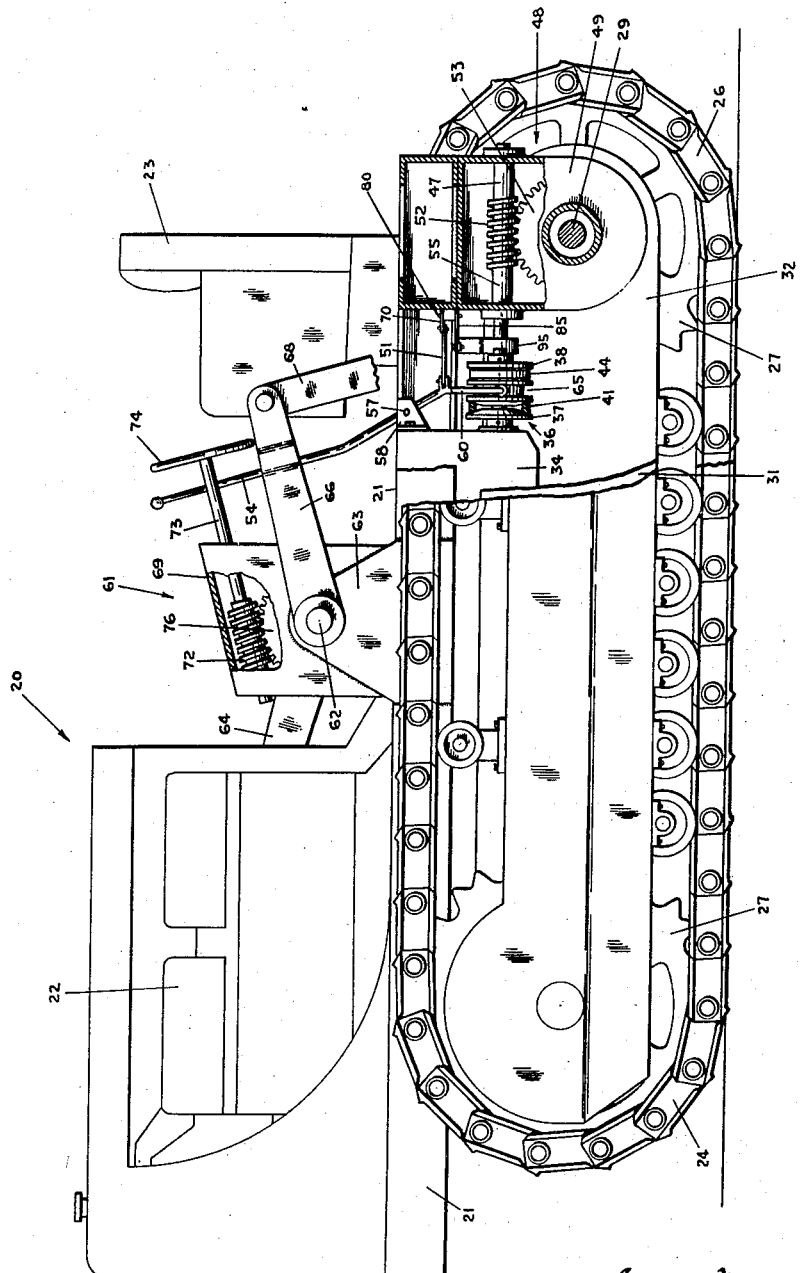
Fig. 1 is a side elevational view of the tractor assembly of this invention, with some parts broken away to more clearly show the construction thereof.

With reference to the drawing, the tractor assembly of this invention, indicated generally at 20, is illustrated in Fig. 1 as including a main frame 21 which carries a usual engine 22, seat assembly 23, and a pair of longitudinally extended ground engaging track units 24 and 26 arranged on opposite sides of the main frame 21. The track units 24 and 26 are rotatably carried on drive sprockets 27 and idlers (not shown) with the sprocket 27 for the unit 24 being adjacent the front of the tractor and the idler at the rear of the tractor and with these members being reversely arranged for the unit 26. A pair of transversely extended, longitudinally spaced front and rear drive shafts 29 (Figs. 1 and 2), carried by the main frame 21, correspond to the drive sprockets 27 and drive the same. Each sprocket 27 is keyed to a shaft 29 by key 27'.

Figure 3:
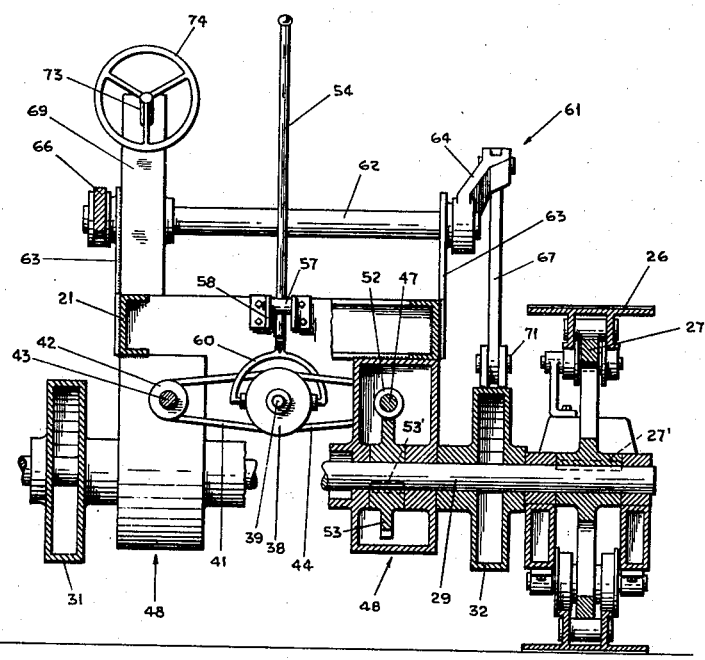
Fig. 3 is a transverse sectional view as seen along the line 3—3 in Fig. 2.

Corresponding to the track units 24 and 26, are a pair of longitudinally extended track support frames 31 and 32, respectively, positioned between the tractor frame 21 and a corresponding track unit (Figs. 3 and 6). The front end 30 of the track support 31 is rotatably carried on the front drive shaft 29, and the rear end 35 of the track support 32 is rotatably mounted on the rear drive shaft 29. Each of the track supports 31 and 32 carries a transverse outwardly extended shaft 33 on which is mounted the idler (not shown) for the corresponding track unit. Thus a shaft 33 is at the front end 40 of the track support 32, and at the rear end 45 of the track support 31.

It is seen, therefore, that the tractor frame 21 is supported at only one pair of diagonally opposite corners 92 and 94 thereof (Fig. 8), on the track units 24 and 26, namely, on the drive shafts 29 which extend from a corresponding track unit transversely across the tractor frame 21, but terminate short of, and, are not connected with the other track unit.

For transmitting power from the tractor engine 22 to the drive shafts 29, there is provided a usual transmission 34 (Fig. 6) having a take off or power shaft 39 which is operatively associated with a clutch unit 36, having a pair of pulleys 37 and 38 arranged in an axially aligned relation on the shaft 39. The pulley 37 is connected through a belt 41 with a pulley 42, carried by a shaft 43 extended longitudinally of the tractor, on the side thereof adjacent the track support 31. Similarly, a belt 44 connects the pulley 38 with a pulley 46 mounted on a shaft 47, which extends longitudinally of the tractor on the other side thereof adjacent to the track support 32. The clutch unit 36 is of a type adapted to transmit power from the take off shaft 39 selectively through the pulleys 37 and 38 to the shafts 43 and 47, respectively, or concurrently to the shafts 43 and 47, for a purpose to appear later.

The shafts 43 and 47 transmit power to the front and rear drive shafts 29, respectively, by means of gear assemblies, indicated generally at 48, one of which is arranged at the front end 50 of the shaft 43 and the other at the rear end 55 of the shaft 47. Since the two gear assemblies 48 are identical in structure and operation only the rear gear assembly 48 (Fig. 1) will be described in detail.

As best appears in Fig. 1, a gear assembly 48 is enclosed by a housing 49 which rotatably supports the rear end portion 55 of the shaft 47. The shaft portion 55, within the housing 49 carries a worm 52 which is in operative engagement with a worm gear 53 keyed by a key 53' to the shaft 29 which extends through the housing 49 at a position below and normal to the shaft 47.

Thus, on rotation of the shafts 43 and 47 the shafts 29 are driven, by means of the gear assemblies 48, to rotate the drive sprockets 27 for operating the track units 24 and 26.

The clutch unit 36 (Figs. 1, 3 and 6) is operated by an upright actuating lever 54 having a yoke member 60 at its lower end positioned within a peripheral groove 65 arranged between the pulleys 37 and 38 of the clutch unit 36. Intermediate its ends, the lever 54 is pivotally supported at 57 on a bracket 58, carried by the main transmission housing 34, for swinging movement of the lever 54 in a substantially vertical plane, in a direction fore and aft of the tractor. The pulleys 37 and 38 are of a usual variable speed type so that when the yoke 60, is moved toward the right, as viewed in Figs. 1 and 2, the side faces of the pulley 37 are spread apart so that the power transmitted from the pulley 37 is progressively decreased and the side faces of the pulley 38 are moved toward each other so that the power transmitted from the pulley 38 is progressively increased. Conversely, on movement of the yoke 60 toward the left as also viewed in Figs. 1 and 3, power transmitted from the pulley 37 is progressively increased and power transmitted from the pulley 38 is progressively decreased. In each instance above, the decrease in power transmitted from the pulleys 37 and 38 may be lowered or reduced to substantially a zero value.

Figure 2:
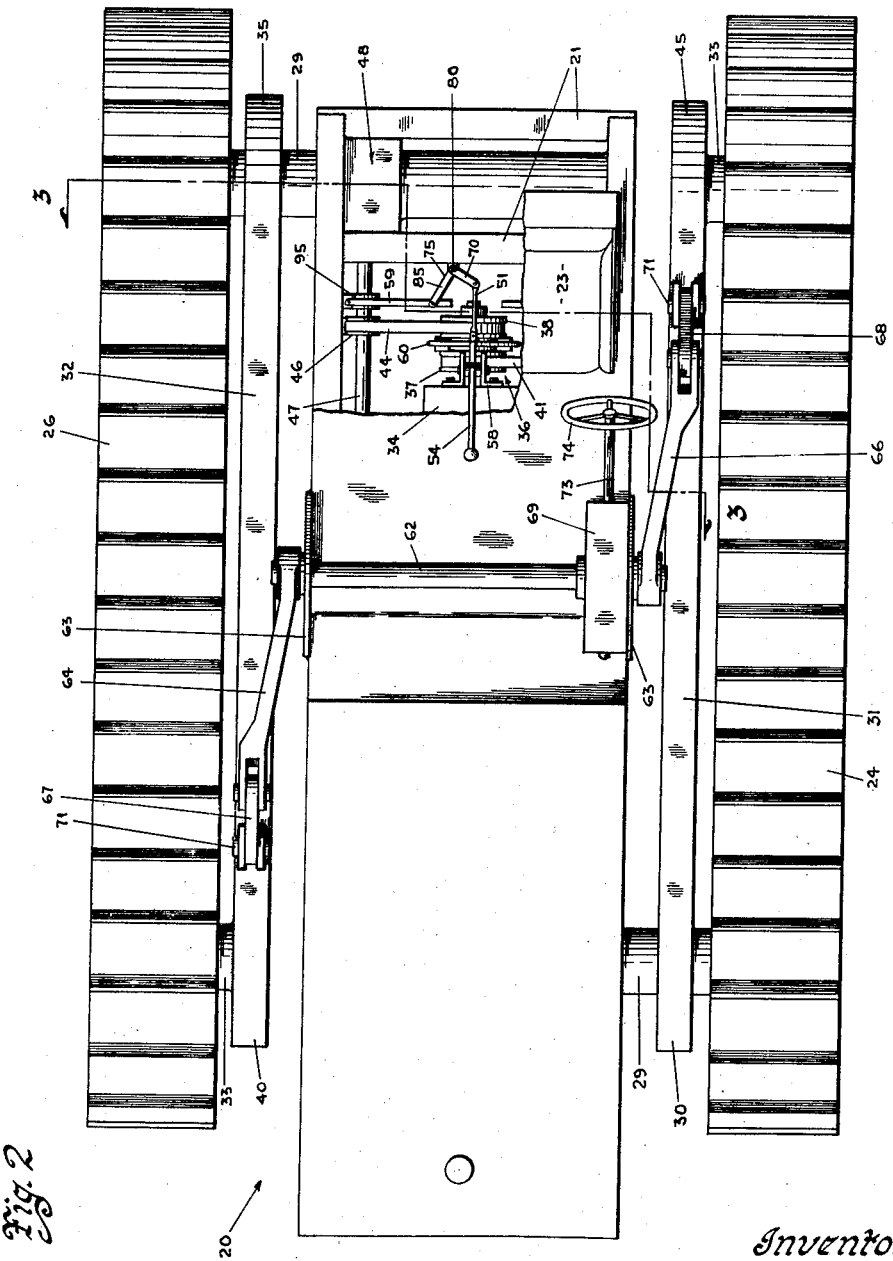
Fig. 2 is a top plan view of the tractor assembly of this invention with some parts broken away for the purpose of clarity.

At a position between the yoke 60 and the pivot support 57, the actuation lever 54 is pivotally connected through a link 51 (Figs. 1 and 2) with one arm 70 of a bell crank 75, which is pivoted at 80 on the tractor main frame 21, for rocking movement in a horizontal plane. The other arm 85 of the bell crank 75 is pivotally connected to a transversely extended arm 59 extended between a pair of brake shoe units 90 and 95, operatively associated with the shafts 43 and 47, respectively (Figs. 2 and 6).

In the operation of the tractor 20, the tractor is steered by operation of the lever 54, which functions as a steering lever. Thus, for a straight forward travel of the tractor 20, the lever 54 is in what might be termed a neutral or center position in which the power transmitted to the belts 41 and 44 from their respective pulleys 37 and 38, to drive the shafts 43 and 47, respectively, is substantially equal whereby the track units 24 and 26 advance at the same speed. With the lever 54 in this neutral position, both the brake units 90 and 95 are out of contact or braking engagement with the shafts 43 and 47, respectively, so that these shafts are freely rotatable.

Assume, now, that the tractor 20 is to be turned to the right, as indicated by the arrow 96 in Fig. 6. The steering lever 54 is manipulated to spread apart the side faces of the pulley 38, so that the belt 44 becomes loose on the pulley 38 resulting in a stopping of the rotational power supplied to the shaft 47. This manipulation of the lever 54, through the link 51 and bell crank 75, concurrently moves the brake unit 95 into frictional engagement with the shaft 47 to positively stop and maintain the track unit 26 in a stopped position. With the shaft 43 receiving power from the engine 22, and with the brake unit 90 out of frictional engagement with the shaft 43, the track unit 24 continues to move forwardly. However, with the track unit 26 maintained in a stopped position, the track unit 24 can only move in a substantially circular path about the track unit 26, so as to effectively turn the tractor assembly 20 to the right.

For a turn to the left, the steering lever 54 is merely manipulated to shut off the transmission of power to the track unit 24, while supplying power alone to the track unit 26, so as to achieve reverse results, namely, a braking of the track unit 24 concurrently with a forward movement of the track unit 26.

Figure 4:
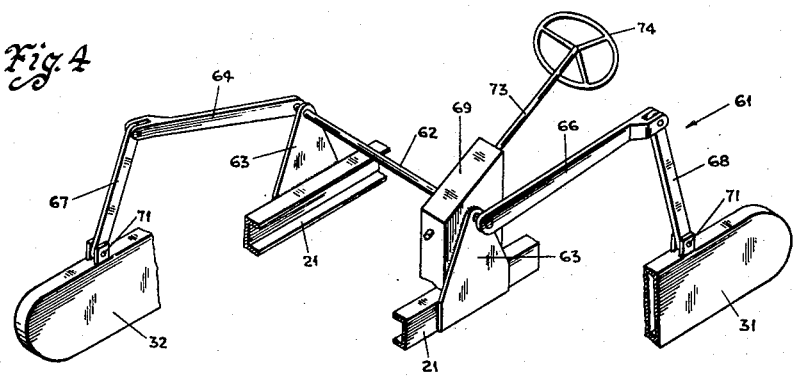
Fig. 4 is a diagrammatic fragmentary perspective view of the actuating mechanism used in the tractor assembly of this invention for adjusting the vertical positions of the ground engaging units for the tractor assembly.

For maintaining the tractor substantially level during travel along the side of a hill, in which the ground surface is inclined in a direction transversely of the tractor, there is provided a tractor leveling mechanism, indicated generally at 61 in Figs. 2, 3 and 4. The leveling mechanism 61 includes a transversely extended rock shaft 62 journaled at its ends in upwardly projected bearing plates 63 which are secured to transversely opposite portions of the tractor main frame 21 and located forwardly of the operator's seat 23. A pair of rock arms 64 and 66 are secured to and project radially from the shaft 62, with the arm 64 being extended forwardly from the shaft 62 and the arm 66 extended rearwardly from the shaft 62. At their outer or free ends, the rock arms 64 and 66 are pivotally connected to the upper ends of a pair of corresponding link members 67 and 68, which are connected at their lower ends to transverse pivots 71 carried on the track support frames 32 and 31, respectively. It is seen therefore that on rocking movement of the shaft 62, the rock arms 64 and 66 are concurrently moved in vertically opposite directions, namely, when the arm 64 is rocked or moved upwardly, the arm 66 is moved downwardly and vice versa.

In order to rock the shaft 62 there is provided a worm gear 76 (Fig. 1) mounted on the shaft 62 adjacent the rock arm 66. This gear 76 is in continuous engagement with a worm 72, mounted on an upwardly and rearwardly inclined shaft 73, which is rotatably supported in a casing or housing 69. The casing 69 houses both the worm gear 76 and the worm 72 and is supported on the tractor frame 21. A hand wheel 74, positioned forwardly of and adjacent the tractor seat 23, is secured to the rear end of the shaft 73 for manually rotating the shaft 73. Thus on rotation of the hand wheel 74 in reversed directions the shaft 62 is rocked in opposite directions to in turn actuate the rock arms 64 and 66.

In the operation of the leveling device 61 assume that the tractor 20 is traveling over a substantially level ground surface such as indicated at 78 in Fig. 7. For such travel, the hand wheel 74 is turned to a position such that the crank arms 64 and 66 are reversely inclined at substantially equal angles relative to a horizontal plane extended through the axis of the shaft 62. For this position of the arms 64 and 66, the support frames 31 and 32 are at the same horizontal level and the track units 24 and 26 are in vertically upright positions.

Now assume that the tractor assembly 20 is traveling along a side hill, in which the ground surface, indicated at 77 in Fig. 8, is inclined in a direction transversely of the tractor. The hand wheel 74 is manipulated to rock the shaft 62 to move the rock arm 64 in an upward direction concurrently with a movement of the rock arm 66 in a downward direction. As shown in Fig. 8, the forwardly extended rock arm 64 is moved upwardly so as to increase the inclination thereof from the horizontal and the rearwardly extended rock arm 66 is moved to a substantially horizontal position. In response to such reversed movements of the rock arms 64 and 66, the connecting links 67 and 68, respectively, are operated to raise the support frame 32 relative to the support frame 31. The track units 24 and 26, however, are maintained in substantially vertical positions to provide for an equal distribution of the tractor weight on the tracks 24 and 26. Concurrently with the maintaining of the tracks 24 and 26 in substantially vertical positions, the tractor main frame 21 is inclined upwardly and rearwardly (Fig. 8) as a consequence of the movement of the rock arms 64 and 66. In other words, upon upward movement of the arm 64 and downward movement of the arm 66, the frame 21 is pivoted about the shafts 29 with a resultant longitudinal tilting thereof.

As the tracks 24 and 26 are swung in reverse directions about their respective shafts 29, the position of the frame 21 is of course changed, since the frame 21 is supported on the tracks 24 and 26. Thus, as the track 26 is swung upwardly, the right front corner 91 of the frame 21 is moved downwardly to a position in transverse alignment with the left front corner 92 of the frame 21. Likewise, in the Fig. 8 position of the tractor 20, the track 24 is swung in a downward direction so that the left rear corner 93 of the frame 21, which is opposite the free end of the track 24, is moved upwardly to a position in transverse alignment with the right rear corner 94 of the frame 21. The frame 21 is thus level in a direction transversely thereof so that if a level were positioned transversely of the frame 21 at any position along the length of the frame 21, the level would indicate a substantially horizontal position for the frame 21.

Stated otherwise, for any condition of side hill travel of the tractor 20 over reasonable slopes, the rock shaft 62 is actuated to swing the tracks 24 and 26 to parallel positions inclined in a direction longitudinally of the frame 21 sufficient to move transversely opposite portions of the frame 21 to horizontally aligned positions. As a result, the frame 21 is tilted in a direction longitudinally thereof by virtue of the lowering of the right front corner 91 to the level of the left front corner 92 and the raising of the left rear corner 93 to the level of the right rear corner 94.

In other words the right front corner 91 of the frame 21 is moved downwardly to the level of the left front corner 92, the level of which is determined by the track 24 since such corner carries the drive shaft 29 for the track 24 and is thus in a fixed position relative to the track 24. Similarly the left rear corner 93 of the tractor frame 21 is swung upwardly to the level of the right rear corner 94, which carries the drive shaft 29 for the track 26. Thus, in effect, by virtue of the leveling device 61 the tractor frame 21 is maintained substantially level in a direction transversely of the tractor 20, and the track units 24 and 26 are maintained in upright positions. The tractor frame 21 (Fig. 8) is, however, tilted in a direction longitudinally of the tractor 20. This longitudinal tipping of the main frame 21 is not objectionable and does not affect the operation of the tractor 20.

Similarly if the tractor assembly 20 is traveling along a side hill which is inclined in a reversed direction from the inclination of the ground surface 77, the rock arms 64 and 66 are merely rocked in reverse directions from that above described, with the longitudinal tipping movement of the frame 21 being also reversed. As a result, in traveling over an inclined surface the load distribution of the tractor 20 on the track units 24 and 26 remains unchanged so as to eliminate any tendency of the tractor 20 to slide or move down such incline whereby a straight forward advance of the tractor is maintained.

The leveling mechanism is operative over reasonable slopes within its own limits to maintain the frame 21 level. Thus the length of the rocker arms 64 and 66 and the connected links 67 and 68 respectively will determine how much opposite adjustment of the tracks is possible. When the hand wheel 74 is actuated in one direction until one of the rocker arms and its connected link is in alignment it is obvious that further turning of the hand wheel will make no further adjustment of the frame 21 relative to the tracks. This leveling mechanism 61 is readily suitable to maintaining the frame substantially level transversely of the tractor for reasonable slopes encountered in practical operation.

Figure 5:
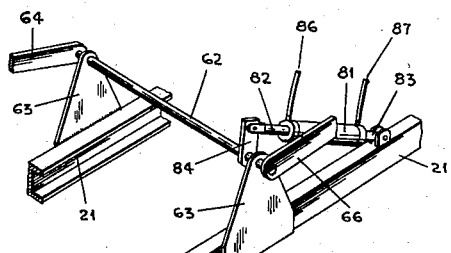
Fig. 5 is a diagrammatic fragmentary perspective view, illustrated similarly to Fig. 4, and showing a modified form of actuating mechanism for the tractor ground engaging units.

In the modified form of leveling device shown in Fig. 5, a hydraulic cylinder assembly 81 is substituted for the gears 72 and 76 and the hand wheel 74 in the leveling device 61 illustrated in Figure 4. The cylinder assembly 81 is pivotally connected at one of its ends, indicated at 83, to the main frame 21. A piston rod 82 extends outwardly from the other end of the cylinder assembly 81 for pivotal connection to an actuating arm 84 secured to the rock shaft 62 which carries the rock arms 64 and 66 as previously described. The cylinder assembly 81 is of double acting type and is equipped with a pair of oil lines 86 and 87 that are suitably connected with a usual tractor operated pump (not shown). Thus, when oil is admitted to the cylinder assembly 81 through the oil line 86, the piston rod 82 is retracted in the cylinder 81 to thus move the rock shaft actuating arm 84 in a clockwise direction as viewed in Fig. 5. Likewise, when oil is admitted to the cylinder 81 through the oil line 87, the piston rod 82 is moved outwardly of the cylinder 81 to thus move the actuating arm 84 in a reverse direction. In all other respects, a tractor assembly equipped with the leveling device of Fig. 5 is operated in a manner similar to that above described relative to the leveling device 61.

From the above description, it is seen that this invention provides a tractor assembly 20 having a tractor leveling device which is readily operated to maintain the tractor against side slippage when traveling on a side hill, and with the tractor load being substanitally equally distributed on the tracks 24 and 26 for side hill travel. While the invention has been described in detail with respect to a tractor 20 having the track units 24 and 26, of well known type, it is apparent that the invention may be practiced on tractors equipped with other traction units such as tandem wheels.

Although the invention has been described with respect to several embodiments thereof, it is to be understood that it is not to be so limited since changes can be made therein which are within the full intended scope of this invention as defined by the appended claims.

I claim:

1. In a tractor assembly, the combination of a main frame, a pair of traction units arranged at opposite sides of said frame, with each of said traction units including ground engaging portions at opposite ends of said tractor, a pair of inwardly extended transverse drive shafts corresponding to said traction units, with the shaft on one of said units being spaced longitudinally from the shaft on the other of said traction units, means pivotally supporting said frame on said shafts, a transverse rock shaft on said frame located intermediate said frame pivot supports, a pair of oppositely extended rock arms on said rock shaft corresponding to said traction units, with each arm being projected away from a corresponding drive shaft, link means corresponding to said traction units pivotally connecting a corresponding rock arm to a corresponding traction unit at a position spaced longitudinally from the drive shaft therefor, and means for rocking said rock shaft.

2. A tractor assembly comprising a main frame, a pair of traction units arranged at opposite sides of said frame, with each of said traction units including ground engaging portions at opposite ends of said tractor, a pair of transverse drive shafts, each secured in driving relationship with a traction unit, with said drive shafts being arranged at diagonally opposite portions of said frame, means pivotally supporting said frame on the drive shafts, a transverse rock shaft on said frame, a pair of rock arms on said rock shaft corresponding to said traction units, said rock arms extending in opposite directions from the rock shaft, link means connecting a rock arm with a corresponding traction unit at a point remote from the point of connection between the drive shaft and the particular traction unit, and means for rocking said rock shaft to concurrently swing said traction units about their corresponding drive shafts in opposite directions relative to said frame.

3. A tractor assembly comprising a main frame, a pair of longitudinally extended ground engaging units arranged at opposite sides of said frame, with each of said units having ground engaging portions at opposite ends of said tractor, a pair of transverse pivots corresponding to and supported on said ground engaging units and arranged at diagonally opposite portions of said frame, means pivotally supporting said frame portions on said pivots, and means on said frame for concurrently pivotally moving said ground engaging units about the transverse pivots therefor in reversed vertical directions relative to said frame, said means including a pair of portions corresponding to said transverse pivots and connected to said ground engaging units at positions spaced longitudinally from a corresponding transverse pivot.

4. A tractor assembly comprising a main frame, a pair of traction means supporting frames extended longitudinally of said main frame and arranged at opposite sides thereof, a traction means on each of said supporting frames having ground engaging portions adjacent opposite ends of a corresponding supporting frame, a pair of transverse drive shafts corresponding to and carried on said supporting frames, with said shafts being located adjacent opposite end portions of said main frame, means pivotally supporting said frame portions on said drive shafts, and means on said main frame for concurrently pivotally moving said supporting frames in opposite directions about their corresponding drive shafts, said means including a pair of portions corresponding to said supporting frames and connected to said supporting frames at a position spaced longitudinally from a corresponding drive shaft.

References Cited in the file of this patent

UNITED STATES PATENTS

| | | |
|---|---|---|
| 842,804 | Murrell | Jan. 29, 1907 |
| 1,088,404 | Clow | Feb. 24, 1914 |
| 1,257,704 | Haupt | Feb. 26, 1918 |
| 1,316,232 | Haupt | Sept. 16, 1919 |
| 2,089,042 | Straussler | Aug. 3, 1937 |
| 2,434,693 | Graham | Jan. 20, 1948 |